United States Patent [19]

Grosselin

[11] Patent Number: 4,860,787
[45] Date of Patent: Aug. 29, 1989

[54] PRESSURE REGULATOR WITH INTEGRATED SENSOR

[75] Inventor: Pascal Grosselin, Bren, France
[73] Assignee: IMAJE, S.A., Bourg les Valence, France
[21] Appl. No.: 105,303
[22] PCT Filed: Jan. 12, 1987
[86] PCT No.: PCT/FR87/00009
   § 371 Date: Sep. 10, 1987
   § 102(e) Date: Sep. 10, 1987
[87] PCT Pub. No.: WO87/04537
   PCT Pub. Date: Jul. 30, 1987
[51] Int. Cl.$^4$ ............................................. G05D 16/00
[52] U.S. Cl. .................................. 137/487.5; 137/82; 251/129.08
[58] Field of Search .................... 137/82, 487.5, 85; 251/129.08

[56] References Cited

U.S. PATENT DOCUMENTS

| | | | |
|---|---|---|---|
| 2,614,583 | 10/1952 | Di Maggio | 137/82 |
| 2,960,097 | 11/1960 | Scheffler | 137/82 |
| 3,283,769 | 11/1966 | De Meo | 137/82 |
| 3,482,588 | 12/1969 | Kreuter | 137/85 |
| 3,799,498 | 3/1974 | Wickham | 137/82 X |
| 4,512,357 | 4/1985 | Earl | 137/82 |
| 4,550,747 | 11/1985 | Woodworth | 137/85 X |

FOREIGN PATENT DOCUMENTS

| | | |
|---|---|---|
| 3347248 | 7/1985 | Fed. Rep. of Germany . |
| 2353095 | 12/1977 | France . |
| 2528192 | 12/1983 | France . |
| 57-205162 | 12/1982 | Japan . |
| 2165372 | 4/1986 | United Kingdom . |

Primary Examiner—Alan Cohan
Attorney, Agent, or Firm—Roland Plottel

[57] ABSTRACT

The invention provides a fluid pressure regulator with integrated sensor, including a single block (1), the fluid flow section combining the regulator and the sensor (12). In another block (2) integrally secured to the first, is provided a control system formed by a stepper motor (6) acting on the order of an external automatic device, for closing an orifice (0) to a greater or lesser degree by means of a valve (10), a spring (9), a pusher (8) and a spool (7) so as to create a fluid leak (fr) for causing a fine variation of the operating pressure (pu). Sealing between the two blocks (1) and (2) is obtained by the presence of a membrane (3). The spool (7) acts on the pusher (8) through this membrane.

15 Claims, 1 Drawing Sheet

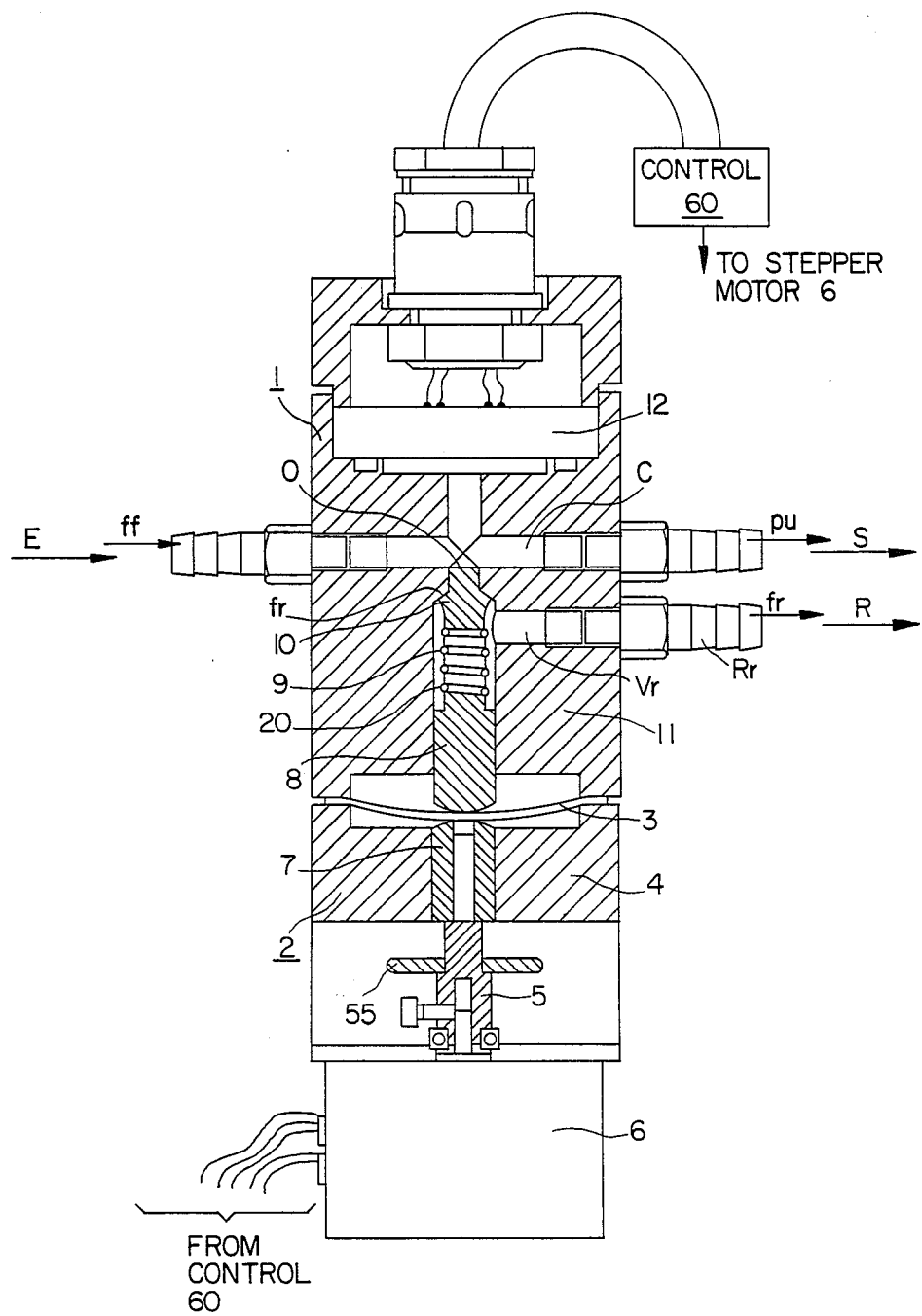

PRESSURE REGULATOR WITH INTEGRATED SENSOR

The invention relates to a fluid pressure regulator with integrated sensor.

In all devices using the pressure of a fluid in a hydraulic circuit, it is generally necessary to constantly and very accurately detect, regulate and adjust said fluid pressure.

This is the case more particularly with printers using a continuous jet of ink drops, these drops having to be fed at a constant and very precise pressure to the modulation body towards a calibrated nozzle.

Generally, the control and servo control systems, and particularly the sensor, are separated from the pressure regulation units and so are voluminous with pipes and risks of pressure drops and leaks.

Moreover, sealing of the regulation units themselves is often provided by a bellows or by a radial seal placed on the piston.

These solutions are not compatible with their use in ink jet printers. The ink is not a lubricant and has the disadvantage of drying, which causes the piston to stick during the times when the device is not used.

In general, existing devices do not allow a sufficiently fine pressure regulation to be obtained in use, especially with nominal low pressures, for satisfying certain applications.

This is more particularly the case of ink pressures used in ink jet printers.

The purpose of the invention is to overcome these drawbacks and corresponds to the above mentioned requirements.

It relates more precisely to a pressure regulator and sensor associated with a pressure reducer programmable by means of a stepper motor.

Such a device is characterized in that, since it is monolithic, it includes in a single block, the fluid flow section combining the regulator and the sensor and which another block is associated formed by the control system.

Although integrally secured to the first one, this latter block is completely isolated from the fluid part.

The invention will be better understood from the following explanations and the accompanying FIGURE which shows an elevational section of the device of the invention.

In this FIG. 1, the device is shown in the state for obtaining the minimum operating pressure.

Section 1 which will be called hereafter the "fluid section", is formed by a body 11 having an inlet for the fluid E, a channel C, extending this latter and a fluid outlet S.

From inlet E to outlet S channel C has continually flowing therethrough the fluid ff which is collected at the outlet S at an operating pressure pu which must be perfectly precise and regulated.

This body 11 is also formed vertically and centrally with a bore 20 opening into the channel C of the operating fluid.

In this bore is freely movable a pusher 8 bearing on a spring 9 itself acting on a valve 10 adapted for completely closing bore 20 or not.

This cylinder 20 is in direct communication with a return path Vr extended by an external connection Rr.

With the top of this "fluid section" 1 is associated a pressure sensing cell 12 which provides permanent reading of the user pressure obtained pu.

As the base of this "fluid section" 1, a "dry section" 2 is formed of a body 4 in which is mounted a free sliding spool 7 which cooperates with a pusher 8 for acting on the members of the "fluid section" 1 under the action of a screw 5 driven by a stepper motor 6.

For providing sealing of the device, a flexible membrane 3 is inserted between the "fluid section" 1 and the "dry section" 2.

It is through this membrane 3 that spool 7 bears on pusher 8. It thus follows the deformations which are imposed on it by the up and down movements of spool 7 and pusher 8.

Considering the position of membrane 3 in FIG. 1, it should be recalled that the device is in the state for obtaining the minimum operating pressure pu.

A manual redundance for controlling screw 5 by means of wheel 55 is provided should the stepper motor 6 itself fail, or in the case of a programmable servo control system.

According to an important feature of the invention, the fine adjustment of the operating pressure pu of the fluid ff flowing through channel C is obtained through an external automatic device 60 which acts on the stepper motor 6 so as to stress spring 9 to a greater or lesser degree under the action of screw 5, which results in creating a leak fr through orifice O at the top of cylinder 20, which simultaneously causes a variation of the pressure pu. The fluid leaking through the leak fr is discharged through the return pipe R.

The operation of the device of the invention is described below.

Depending on a given command, external automatic device 60 acts on the stepper motor 6, which results in stressing spring 9 to a greater or lesser degree through spool 7 acting on pusher 8 through a flexible membrane 3 which provides sealing between the two sections.

This spring 9 cooperating with valve 10 opposes to the pressure pu in channel C a counterpressure equal to or less than this latter, which results in closing the orifice O to a greater or lesser degree and thus creating a leak fr, the consequence of which is to vary very finely and accurately the operating pressure pu which passes through channel C.

The fluid resulting from the leak is discharged through the return pipe R.

The operating pressure pu is permanently read by cell 12 which cooperates with the stepper motor 6 for stopping its action as soon as the desired pressure pu is reached.

As soon as a variation in the operating pressure pu is detected by cell 12, the servo controlled stepper motor 6 acts on screw 5 for correcting the variation pu in accordance with the above described procedure.

Another important feature of the invention resides in the fact that the presence of spring 9 placed under the valve does away with the pumping phenomenon by absorbing the very low pressure variations.

By way of example, the regulation precision obtained by the device of the invention, for an operating pressure range of 0.5 to 13 bars is of the order of 200 millibars. In its preferred use in ink jet printers, in which the pressures pu vary from 0.5 to 5 bars, the regulation accuracy obtained is 18 millibars.

Finally, another important feature of the invention is that this device also allows the pump, supplying the pressure of the fluid used, to operate under optimum conditions, the regulator varying the pressure through the adjustable leak fr while maintaining a fixed speed for the pump.

The invention applies to all hydraulic systems requiring great accuracy in the regulation of the operating pressure of the fluid considered.

It finds more particularly a privileged application in all ink jet printers.

I claim:

1. Device for regulating the pressure of a fluid including a pusher (8) bearing on a spring (9) and acting on a valve (10) adapted for closing a fluid passage or not; characterized in that the fluid (ff) transmits through a duct (c) in the fluid passage from an inlet (E) towards an outlet (S) formed in a body (11), into which duct (C) opens, on each side thereof and perpendicularly to said duct, a bore (20) also formed in said body (11) and connected on one side to said pusher (8) and with said valve in said bore adjacent to said duct and on the other to a pressure sensor (12) also integrated in said body (11), said body (11) being solidly connected to a second body (4) in which a spool (7) freely slides capable of cooperating with said pusher (8), and a flexible membrane (3) provides sealing between the two bodies (11) and (4) which then form a monolithic assembly.

2. Device according to claim 1, characterized in that the fine regulation of the operating pressure (pu) of the fluid (ff) flowing through channel (C) is obtained by means of an external or automatic device which acts on a stepper motor (6), depending on a given command, so as to stress the spring (9) to a greater or lesser degree under the action of a screw (5) acting on the spool (7), which results in creating a leak (fr) through an orifice (O) created or closed at the top of the bore (20), which causes a variation in the pressure (pu).

3. Device according to claim 2, characterized in that the fluid resulting from the leak (fr) is discharged through a return pipe (R).

4. Device according to claim 2, characterized in that at all times the operating pressure is permanently read by the pressure sensor (12) which cooperates with the stepper motor (6) for stopping its action as soon as the desired pressure (pu) is reached.

5. Device according to claim 4, characterized in that the screw (5) can be controlled manually by means of a wheel (55) should the stepper motor (6) fail or in the case of a programmable servo control system.

6. Device according to claim 1, characterized in that the presence of the spring (9) acting on the valve (10) avoids the pumping phenomenon by absorbing the very small pressure variations.

7. Device according to claim 2 characterized in that said device is adapted to be connected to a pump delivering the fluid pressure is used under optimum conditions, the regulator causing the pressure to vary by means of an adjustable leak (fr) while keeping a fixed speed for the pump.

8. Device according to claim 2 characterized in that the presence of the spring (9) acting on the valve (10) avoids the pumping phenomenon by absorbing very small pressure variations.

9. Device according to claim 3 characterized in that the presence of the spring (9) acting on the valve (10) avoids the pumping phenomenon by absorbing very small pressure variations.

10. Device according to claim 4 characterized in that the presence of the spring (9) acting on the valve (10) avoids the pumping phenomenon by absorbing very small pressure variations.

11. Device according to claim 5 characterized in that the presence of the spring (9) acting on the valve (10) avoids the pumping phenomenon by absorbing very small pressure variations.

12. Device according to claim 3 characterized in that said device is adapted to be connected to a pump delivering the fluid pressure is used under optimum conditions, the regulator causing the pressure to vary by means of an adjustable leak (fr) while keeping a fixed speed for the pump.

13. Device according to claim 4 characterized in that said device is adapted to be connected to a pump delivering the fluid pressure is used under optimum conditions, the regulator causing the pressure to vary by means of an adjustable leak (fr) while keeping a fixed speed for the pump.

14. Device according to claim 5 characterized in that said device is adapted to be connected to a pump delivering the fluid pressure is used under optimum conditions, the regulator causing the pressure to vary by means of an adjustable leak (fr) while keeping a fixed speed for the pump.

15. Device according to claim 6 characterized in that said device is adapted to be connected to a pump delivering the fluid pressure is used under optimum conditions, the regulator causing the pressure to vary by means of an adjustable leak (fr) while keeping a fixed speed for the pump.

* * * * *